United States Patent
Schaffer-Lequart et al.

(10) Patent No.: US 10,412,974 B2
(45) Date of Patent: Sep. 17, 2019

(54) FROZEN CONFECTIONARY PRODUCTS COMPRISING HYDROLYZED WHOLE GRAIN

(75) Inventors: Christelle Schaffer-Lequart, Mezieres (CH); Olivier Yves Roger, Moudon (CH); Anne-Sophie Wavreille, Lausanne (CH); Anne-Cecile Agnes Lebleu, Beauvais (FR); Beatrice Jeannine Bailleul, Allonne (FR)

(73) Assignee: Societe des Produits Nestle S.A., Vevey (CH)

(*) Notice: Subject to any disclaimer, the term of this patent is extended or adjusted under 35 U.S.C. 154(b) by 784 days.

(21) Appl. No.: 13/992,994

(22) PCT Filed: Dec. 8, 2011

(86) PCT No.: PCT/EP2011/072173
§ 371 (c)(1),
(2), (4) Date: Jun. 10, 2013

(87) PCT Pub. No.: WO2012/076641
PCT Pub. Date: Jun. 14, 2012

(65) Prior Publication Data
US 2013/0259975 A1 Oct. 3, 2013

(30) Foreign Application Priority Data
Dec. 8, 2010 (WO) .............. PCT/EP2010/069206

(51) Int. Cl.
*A23G 9/42* (2006.01)
*A23G 9/34* (2006.01)
*A23L 7/10* (2016.01)
*A23L 7/104* (2016.01)
*A23L 33/21* (2016.01)

(52) U.S. Cl.
CPC ............ *A23G 9/42* (2013.01); *A23G 9/34* (2013.01); *A23L 7/107* (2016.08); *A23L 7/115* (2016.08); *A23L 7/197* (2016.08); *A23L 33/21* (2016.08)

(58) Field of Classification Search
CPC ... A23G 9/42; A23L 1/09; A23L 1/095; A23L 1/1055; C12Y 302/01001
USPC .............................. 426/28, 63, 64
See application file for complete search history.

(56) References Cited

U.S. PATENT DOCUMENTS

| 4,282,319 A | 8/1981 | Conrad |
| 4,368,211 A | 1/1983 | Blake et al. |
| 4,377,602 A * | 3/1983 | Conrad .......................... 426/656 |
| 4,894,242 A | 1/1990 | Mitchell et al. |
| 4,996,063 A | 2/1991 | Inglett |
| 5,225,219 A | 7/1993 | Inglett |
| 5,686,123 A | 11/1997 | Lindahl et al. |
| 5,723,162 A * | 3/1998 | Whalen et al. ................ 426/28 |
| 5,989,598 A | 11/1999 | Whalen et al. |
| 6,395,314 B1 | 5/2002 | Whalen et al. |
| 2006/0280838 A1 | 12/2006 | Kvist et al. |
| 2007/0014892 A1 | 1/2007 | Mitchell et al. |
| 2010/0112127 A1 | 5/2010 | Chatel et al. |

FOREIGN PATENT DOCUMENTS

| CN | 1649503 | 8/2005 |
| CN | 101313726 | 12/2008 |
| EP | 0231729 | 8/1987 |
| KR | 20080024778 | 3/2008 |
| WO | 9726799 | 7/1997 |
| WO | 02065855 | 8/2002 |
| WO | 2010023351 | 3/2010 |

OTHER PUBLICATIONS

Izydorczyk, M. S. et al. 1995. Carbohydrate Polymers. 28: 33-48.*
Maes, C. et al. 2004. J. Cereal Sci. 39: 181-186.*
Bunzel, M. et al. J. Sci. Food Agric. 81: 653-660 (2001).*
Garcia-Carreno, F. L., Biotechnology Education. 2: 150-153 (1991).*
Chang et al. "Casein micelles partially hydrolyzed by chymosin to modify the texture of lowfat ice cream" Journal of Dairy Science, vol. 78 (1995), pp. 2617-2623—XP000580304.
Gruchala et al. "Raw-Starch Degrading Amylase(s) Affect Enzyme-resistant Starch." Journal of Food Science, vol. 57 (1992), pp. 1433-1434—XP002630379.
Tsuchikawa, M., "Iced confectionery such as frappe and sleet, frozen yogurt, sherbet, popsicle and non-frozen ice-cream cake, comprising wheat-derived protein hydrolysis substance as foaming agent, has specified overrun," WPI / Thomson Abstract— Application No. JP2003-486004, 2 pages—XP002674121.
Lite Li, "Physical Properties of Foods", China Agriculture Press, Jan. 2006, p. 123.
Chinese Office Action for Application No. 201180057836.X, 18 pages.
Chinese Office Action for Application No. 201180057836.X, dated Jan. 5, 2015, 20 pages.

* cited by examiner

*Primary Examiner* — Hamid R Badr
(74) *Attorney, Agent, or Firm* — K&L Gates LLP (57) ABSTRACT

The present invention relates to frozen confectionary product comprising up to 20% wt fat, up to 25% milk solids non fat (MSNF), from 5 to 40% wt sweetening agent and up to 3% of stabilizer and/or emulsifier, wherein said frozen confectionery further comprises a hydrolyzed whole grain composition and an alpha-amylase or fragment thereof which alpha-amylase or fragment thereof shows no hydrolytic activity towards dietary fibers when in the active state.

18 Claims, 5 Drawing Sheets

FROZEN CONFECTIONARY PRODUCTS COMPRISING HYDROLYZED WHOLE GRAIN

CROSS REFERENCE TO RELATED APPLICATIONS

The present application is a National Stage of International Application No. PCT/EP2011/072173, filed on Dec. 8, 2011, which claims priority to PCT Application No. PCT/EP2010/069206, filed Dec. 8, 2010, the entire contents of which are being incorporated herein by reference.

TECHNICAL FIELD OF THE INVENTION

The present invention relates to frozen confectionary products being supplemented with whole grain. In particular the present invention relates to frozen confectionary products which are supplemented with hydrolysed whole grain, where neither texture or viscosity of the frozen confectionary products have been compromised. The use of hydrolysed whole grain to improve the stability of frozen confectionery products is also an object of the present invention.

BACKGROUND OF THE INVENTION

There is now extensive evidence emerging mainly from epidemiological studies that a daily intake of three servings of whole grain products, i.e. 48 g of whole grain, is positively associated with decreased risk of cardiovascular diseases, increased insulin sensitivity and decreased risk of type 2 diabetes onset, obesity (mainly visceral obesity) and digestive system cancers. These health benefits of the whole grains are reported to be due to the synergistic role of the dietary fibers and other components, such as vitamins, minerals and bioactive phytochemicals.

The regulatory authorities in Sweden, the US and the UK have already approved specific heart health claims based on the available scientific substantiation. Food products comprising dietary fibers are also growing in popularity with consumers, not just because whole grain consumption is now included in some national dietary recommendations but also because whole grain products are considered wholesome and natural. Recommendations for whole grain consumption have been set up by government authorities and expert groups to encourage consumers to eat whole grains. For instance, in the U.S.A, recommendations are to consume 45-80 g of whole grain per day. However, data provided by national dietary surveys in the United Kingdom, the U.S.A. and China show that whole grain consumption varies between 0 and 30 g whole grains per day.

The lack of whole grain products offered on the shelves and the poor organoleptic properties of the available whole grain products are generally identified as barriers for whole grain consumption and restrict the amount of whole grain to be added to e.g. a frozen confectionary product, because, when increased amounts of whole grain are added the physical and organoleptic properties of the frozen confectionary products changes dramatically.

Whole grains are also a recognised source of dietary fibers, phytonutrients, antioxidants, vitamins and minerals. According to the definition given by the American Association of Cereal Chemists (AACC), whole grains, and food made from whole grains, consist of the entire grain seed. The entire grain seed comprises the germ, the endosperm and the bran. It is usually referred to as the kernel.

Moreover, in recent years, consumers have increased attention to the label of food products, such as frozen confectionary products, and they expect manufactured food products to be as natural and healthy as possible. Therefore, it is desirable to develop food processing technologies and food products that limit the use of non-natural food additives, even when such non-natural food additives have been fully cleared by health or food safety authorities.

Given the health benefits of whole grain cereal, it is desirable to provide a whole grain ingredient for frozen confectionary products having as much intact dietary fibers as possible. Frozen confectionary products are a good vehicle for delivering whole grains and to increase the whole grain content of a product or a serving, it is of course possible to increase the serving size. But this is not desirable as it results in a greater calorie intake. Another difficulty in just increasing the whole grain content of the product is that it usually impacts on physical properties such as the taste, texture and the overall appearance of the frozen confectionary product (organoleptic parameters), as well as its processability.

The consumer is not willing to compromise frozen confectionary products organoleptic properties, in order to increase his daily whole grain intake. Taste, texture and overall appearance are such organoleptic properties.

Obviously, industrial line efficiency is a mandatory requirement in the food industry. This includes handling and processing of raw materials, forming of the frozen confectionary products, packaging and later storing, In warehouses, on the shelf or at home.

U.S. Pat. No. 4,282,319 relates to a process for the preparation of hydrolysed products from whole grain, and such derived products. The process includes an enzymatic treatment in an aqueous medium with a protease and an amylase. The obtained product may be added to different types of products. U.S. Pat. No. 4,282,319 describe a complete degradation of the proteins present in the whole grain.

U.S. Pat. No. 5,686,123 disclose a cereal suspension generated by treatment with both an alpha-amylase and a beta-amylase both specifically generating maltose units and have no glucanase effect.

Thus, it is an object of the present invention to provide frozen confectionary products that are rich in whole grains and in dietary fibers, while maintaining a low calorie intake, that provide an excellent consumption experience to the consumer, and that may be easily industrialised at a reasonable cost without compromising the organoleptic parameters.

SUMMARY OF THE INVENTION

Accordingly, in a first aspect the invention relates to a frozen confectionary product comprising 0 to 20% by weight fat, up to 25% by weight milk solids non fat (MSNF), 5 to 35% sweetening agent and up to 3% of stabiliser and/or emulsifier, wherein said frozen confectionery comprises:
  a hydrolysed whole grain composition; and
  an alpha-amylase or fragment thereof, which alpha-amylase or fragment thereof shows no hydrolytic activity towards dietary fibers when in the active state.

Another aspect of the present invention relates to a process for preparing a frozen confectionary product according to the present invention, said process comprising:
  1) preparing a hydrolysed whole grain composition, comprising the steps of:
    a) contacting a whole grain component with an enzyme composition in water, the enzyme composition comprising at least one alpha-amylase, said enzyme composition showing no hydrolytic activity towards dietary fibers,
b) allowing the enzyme composition to react with the whole grain component, to provide a whole grain hydrolysate,
c) providing the hydrolysed whole grain composition by inactivating said enzymes when said hydrolysate has reached a viscosity comprised between 50 and 5000 mPa·s measured at 65° C.,
d) optionally concentrating and drying the hydrolysed whole grain component,
2) mixing the hydrolysed whole grain composition with an ingredient mix comprising 0 to 20% by weight fat, up to 25% by weight milk solids non fat (MSNF), 5 to 35% sweetening agent and up to 3% of stabiliser and/or emulsifier;
3) Optionally homogenizing and pasteurizing the mix;
4) freezing while optionally aerating the mix;
5) Optionally extruding the frozen mix at temperature lower than −11° C.;
6) Optionally hardening the frozen mix.

An alternative process for preparing a frozen confectionery product according to the present invention and comprising:
1) preparing a hydrolysed whole grain composition, comprising the steps of:
a) contacting a whole grain component with an enzyme composition in water, the enzyme composition comprising at least one alpha-amylase, said enzyme composition showing no hydrolytic activity towards dietary fibers,
b) allowing the enzyme composition to react with the whole grain component, to provide a whole grain hydrolysate,
c) providing the hydrolysed whole grain composition by inactivating said enzymes when said hydrolysate has reached a viscosity comprised between 50 and 5000 mPa·s measured at 65° C.,
d) optionally concentrating and drying the hydrolysed whole grain component,
2) Preparing an ingredient mix comprising 0 to 20% by weight fat, up to 25% by weight milk solids non fat (MSNF), 5 to 35% sweetening agent and up to 3% of stabiliser and/or emulsifier;
3) Optionally homogenizing, then pasteurizing the mix;
4) Adding the hydrolysed whole grain composition to the pasteurized mix to provide a combined mix;
5) freezing while optionally aerating the combined mix;
6) Optionally extruding the aerated frozen combined mix at temperature lower than −11° C.;
7) Optionally hardening the frozen combined mix;
is also part of the invention.

A further aspect object of the present invention relates to a composite frozen confection comprising the confectionary product as defined in the present invention, In combination with at least a second component covering partially or totally the frozen confectionery product, or consisting of an inclusion.

The use of a hydrolysed whole grain composition in the preparation of a frozen confectionery product to improve the stability in particular to heat shock of said product is also an object of the present invention. A stabilizer product for the preparation of a frozen confectionery product comprising a hydrolysed whole grain composition is also an object of the invention.

BRIEF DESCRIPTION OF THE DRAWINGS

FIG. 1 shows a thin layer chromatography analysis of various enzymes put in contact with dietary fibres. The legend for the different tracks is the following:
A0: pure arabinoxylan spot (blank)
β0: pure beta-glucan spot (blank)
A: arabinoxylan spot after incubation with the enzyme noted below the track (BAN, Validase HT 425L and Alcalase AF 2.4L)
β: beta-glucan spot after incubation with the enzyme noted below the track (BAN, Validase HT 425L and Alcalase AF 2.4L)
E0: enzyme spot (blank)

DETAILED DESCRIPTION OF THE INVENTION

The Inventors of the present invention have surprisingly found that by treating the whole grain component with an alpha-amylase and optionally with a protease the whole grain will become less viscous and the following mixing into the frozen confectionery products may be easier. This results in the possibility to increase the amount of whole grains in the product. Furthermore, the alpha-amylase treatment also results in a reduced need for adding sweetener such as sucrose to the frozen confectionery products. The applicant has also found that unexpectedly, the use of such hydrolysed whole grain composition in a frozen confectionery product was improving the stability in particular to heat shock of said product, and that said composition could therefore at least partly replace the stabilizer system of a frozen confectionery product.

Accordingly, in a first aspect the invention relates to a frozen confectionary product comprising 0 to 20% by weight fat, up to 25% by weight milk solids non fat (MSNF), 5 to 35% sweetening agent and up to 3% of stabiliser and/or emulsifier, wherein said frozen confectionery comprises:
a hydrolysed whole grain composition;
an alpha-amylase or fragments thereof, which alpha-amylase or fragments thereof show no hydrolytic activity towards dietary fibers when in the active state.

Several advantages of having a frozen confectionary product comprising a hydrolysed whole grain component according to the invention may exist:
I. An increase in whole grain and fiber content may be provided in the final product, while the organoleptic parameters of the product are substantially not affected;

II. Dietary fibers from the whole grain may be preserved;

III. Greater sense of satiety substantially without affecting the organoleptic parameters of the product and slower digestion. Currently, there are limitations for enriching frozen confectionaries with whole grain due to non-flowable viscosity, grainy texture, and taste issues. However, the use of hydrolysed whole grain according to the present invention in frozen confectionaries allow for providing the desired viscosity, a smooth texture, minimal flavor impact, and added nutritional health and wellness values;

IV. An additional advantage may be to improve the carbohydrate profile of the frozen confectionary product products by replacing traditional externally supplied sweeteners such as glucose syrup, high fructose corn syrup, invert syrup, maltodextrine, sucrose, fiber concentrate, inulin, etc. with a more wholesome sweetener source.

V. As mentioned above, the hydrolysed whole grain unexpectedly shows a stabilizing effect in the frozen confectionery product.

In the present context the term "frozen confectionary product" Include in particular ice cream, sorbet, sherbet, water ice, frozen yoghurt, frozen dairy, soft ice, mellorine, frozen custard, non-dairy frozen confection, milk ice, ice lolly, slush, gelato, frozen jelly, frozen beverages and frozen desserts. Furthermore, frozen confectionaries include various product formats such as bulk products, novelties, i.e., bar and stick items, hard pack and soft serve, molded, decorated items and slices, desserts, miniatures, cups, cones and various combinations thereof. Frozen confectionary product may also contain optional ingredients such as fruit, nuts, chocolate, etc.

Within the general description of frozen confectionary product may also be included those products substantially similar in structure or function to frozen confectionary product, but which may not meet the specific legal definition(s) of frozen confectionary product in terms of their specific composition and/or process.

Furthermore, the term "frozen confectionary product" It is to be understood to cover products where the product may be stored at ambient temperature (e.g. room temperature) and then subsequently need to be frozen e.g. at home by the consumer or on a point of sell just before consumption. Thus, the freezing step according to the process of the invention may e.g. be performed by the end-user. It is of course also to be understood that the products may be in a frozen state when delivered to the store or sold in the store in a frozen state.

The whole grain component may be obtained from different sources. Examples of whole grain sources are semolina, cones, grits, flour and micronized grain (micronized flour). The whole grains may be grounded, preferably by dry milling. Such grounding may take place before or after the whole grain component being contacted with the enzyme composition according to the invention. In an embodiment of the present invention the whole grain component may be heat treated to limit rancidity and microbial count.

Whole grains are cereals of monocotyledonous plants of the Poaceae family (grass family) cultivated for their edible, starchy grains. Examples of whole grain cereals include barley, rice, black rice, brown rice, wild rice, buckwheat, bulgur, corn, millet, oat, sorghum, spelt, triticale, rye, wheat, wheat berries, teff, canary grass, Job's tears and fonlo. Plant species that do not belong to the grass family also produce starchy seeds or fruits that may be used in the same way as cereal grains, are called pseudo-cereals. Examples of pseudo-cereals include amaranth, buckwheat, tartar buckwheat and quinoa. When designating cereals, this will include both cereal and pseudo-cereals.

Thus, the whole grain component according to the invention may originate from a cereal or a pseudo-cereal. Thus, in an embodiment the hydrolysed whole grain composition is obtained from a plant selected from the group consisting of barley, rice, brown rice, wild rice, black rice, buckwheat, bulgur, corn, millet, oat, sorghum, spelt, triticale, rye, wheat, wheat berries, teff, canary grass, Job's tears, fonlo, amaranth, buckwheat, tartar buckwheat, quinoa, other variety of cereals and pseudo-cereals and mixtures thereof. In general the source of grain depends on the product type, since each grain will provide its own taste profile.

Whole grain components are components made from unrefined cereal grains. Whole grain components comprise the entire edible parts of a grain; i.e. the germ, the endosperm and the bran. Whole grain components may be provided in a variety of forms such as ground, flaked, cracked or other forms, as is commonly known in the milling industry.

In the present context the phrasing "a hydrolysed whole grain composition" refers to enzymatically digested whole grain components or a whole grain component digested by using at least an alpha-amylase, which alpha-amylase shows no hydrolytic activity towards dietary fibers when in the active state. The hydrolysed whole grain composition may be further digested by the use of a protease, which protease shows no hydrolytic activity towards dietary fibers when in the active state.

In the present context it is also to be understood that the phrase "a hydrolysed whole grain composition" is also relating to enzymatic treatment of flour and subsequent reconstitution of the whole grain by blending flour, bran and germ. It is also to be understood that reconstitution may be done before the use in the final product or during mixing in a final product. Thus, reconstitution of whole grains after treatment of one or more of the individual parts of the whole grain also forms part of the present invention.

Prior to or after grinding of the whole grain, the whole grain component may be subjected to a hydrolytic treatment in order to breakdown the polysaccharide structure and optionally the protein structure of the whole grain component.

The hydrolysed whole grain composition may be provided in the form of a liquid, a concentrate, a powder, a juice or a puree. If more than one type of enzymes is used it is to be understood that the enzymatic processing of the whole grains may be performed by sequential addition of the enzymes, or by providing an enzyme composition comprising more than one type of enzyme.

In the present context the phrase "an enzyme showing no hydrolytic activity towards dietary fibers when in the active state" should be understood as also encompassing the enzyme mixture from which the enzyme originates. For example, the proteases, amylases, glucose isomerase and amyloglucosidase described in the present context may be provided as an enzyme mixture before use which is not completely purified and thus, comprise enzymatic activity towards e.g. dietary fibers. However, the activity towards dietary fibers may also come from the specific enzyme if the enzyme is multi-functional. As used in here, the enzymes (or enzyme mixtures) are devoid of hydrolytic activity towards dietary fibers.

The term "no hydrolytic activity" or "devoid of hydrolytic activity towards dietary fibers" may encompass up to 5% degradation of the dietary fibers, such as up to 3%, such as up to 2% and such as up to 1% degradation. Such degradation may be unavoidable if high concentrations or extensive incubation times are used.

The term "In the active state" refers to the capability of the enzyme or enzyme mixture to perform hydrolytic activity, and is the state of the enzyme before it is inactivated. Inactivation may occur both by degradation and denaturation.

In general the weight percentages throughout the application are given as percentage by weight on a dry matter basis unless otherwise stated.

The frozen confectionary according to the invention may comprise a protease which shows no hydrolytic activity towards dietary fibers when in the active state. The advantage of adding a protease according to the invention is that the viscosity of the hydrolysed whole grain may be further lowered, which may also result in a decrease in the viscosity of the final product. Thus, In an embodiment according to the invention the frozen confectionary product comprises said protease or fragment thereof at a concentration of 0.0001 to 5% (w/w) by weight of the total whole grain content, such as 0.01-3%, such as 0.01-1%, such as 0.05-1%, such as 0.1-1%, such as 0.1-0.7%, or such as 0.1-0.5%. The optimal concentration of added proteases depends on several factors. As it has been found that the addition of protease during production of the hydrolysed whole grain may result in a bitter off-taste, addition of protease may be considered as a tradeoff between lower viscosity and off-taste. In addition the amount of protease may also depend on the incubation time during production of the hydrolysed whole grain. For example a lower concentration of protease may be used if the incubation time is increased.

Proteases are enzymes allowing the hydrolysis of proteins. They may be used to decrease the viscosity of the hydrolysed whole grain composition. Alcalase 2.4L (EC 3.4.21.62), from Novozymes is an example of suitable enzymes.

Depending on the incubation time and concentration of protease a certain amount of the proteins from the hydrolysed whole grain component may be hydrolysed to amino add and peptide fragments. Thus in an embodiment 1-10% of the proteins from the whole grain composition is hydrolysed, such as 2-8%, e.g. 3-6%, 10-99%, such as 30-99%, such as 40-99%, such as 50-99%, such as 60-99%, such as 70-99%, such as 80-99%, such as 90-99%, or such as 10-40%, 20-30%, 40-70%, and 60-99%. Again protein degradation may result in a lowered viscosity and improved organoleptic parameters.

In the present context the phrase "hydrolysed protein content" refers to the content of hydrolysed protein from the whole grain composition unless otherwise defined. The protein may be degraded into larger or smaller peptide units or even into amino add components. The person skilled in the art will know that during processing and storage small amount of degradation will take place which is not due to external enzymatic degradation.

In general it is to be understood that the enzymes used in the production of the hydrolysed whole grain composition (and therefore also present in the final product) is different from the corresponding enzymes naturally present in the whole grain component.

Since the frozen confectionaries according to the invention may also comprise proteins from sources, different from the hydrolysed whole grain component, which are not degraded, It may be appropriate to evaluate the protein degradation on more specific proteins present in the whole grain composition. Thus, In an embodiment the degraded proteins are whole grain proteins, such as gluten proteins, globulins, albumins and glycoproteins.

Figure 1:
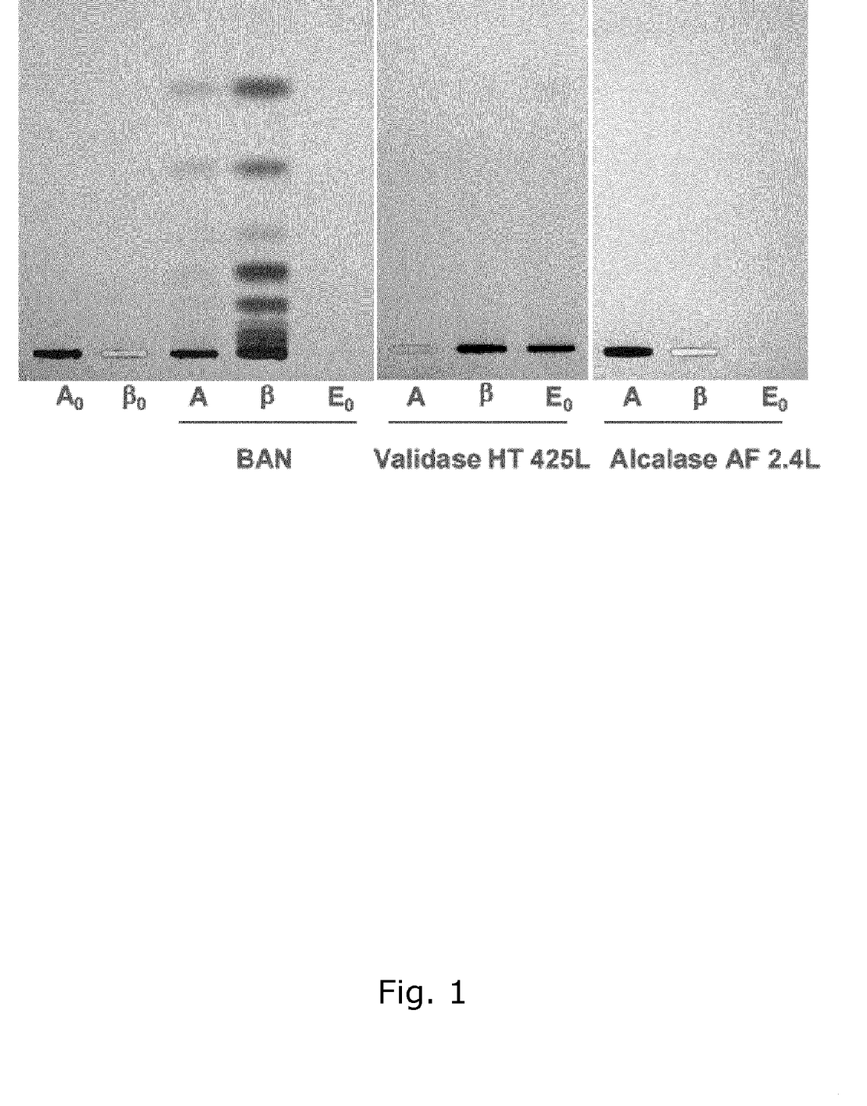

Amylase (EC 3.2.1.1) is an enzyme classified as a saccharidase: an enzyme that cleaves polysaccharides. It is mainly a constituent of pancreatic juice and saliva, needed for the breakdown of long-chain carbohydrates such as starch, into smaller units. Here, alpha-amylase is used to hydrolyse gelatinized starch in order to decrease the viscosity of the hydrolysed whole grain composition. Validase HT 425L, Validase RA from Valley Research, Fungamyl from Novozymes and MATS from DSM are examples of alpha-amylases suitable for the present invention. Those enzymes show no activity towards the dietary fibers in the processing conditions used (duration, enzyme concentrations). On the contrary, e.g. BAN from Novozymes degrades dietary fibers besides starch into low molecular weight fibers or oligosaccharides, see also example 3.

In an embodiment of the present invention the enzymes show no activity towards the dietary fibers when the enzyme concentration is below 5% (w/w), such as below, 3% (w/w), e.g. below 1% (w/w), such as below 0.75% (w/w), e.g. below 0.5% (w/w).

Some alpha-amylases generate maltose units as the smallest carbohydrate entities, whereas others are also able to produce a fraction of glucose units. Thus, In an embodiment the alpha-amylase or fragments thereof is a mixed sugar producing alpha-amylase, including glucose producing activity, when in the active state. It has been found that some alpha-amylases both comprise glucose producing activity while having no hydrolytic activity towards dietary fibers when in the active state. By having an alpha-amylase which comprises glucose producing activity an increased sweetness may be obtained, since glucose has almost twice the sweetness of maltose. In an embodiment of the present invention a reduced amount of external sugar source needs to be added separately to the frozen confectionary product when a hydrolysed whole grain composition according to the present invention is used. When an alpha-amylase comprising glucose producing activity is used in the enzyme composition, it may become possible to dispense or at least reduce the use of other external sugar sources or non-sugar sweeteners.

In the present context the term "external sugar source" relates to sugars not originally present or originally generated in the hydrolysed whole grain composition. Examples of such external sugar source could be sucrose, lactose, maltose, dextrose and artificial sweeteners.

Amyloglucosidase (EC 3.2.1.3) is an enzyme able to release glucose residues from starch, maltodextrins and maltose by hydrolysing glucose units from the non-reduced end of the polysaccharide chain. The sweetness of the preparation increases with the increasing concentration of released glucose. Thus, in an embodiment the frozen confectionary further comprises an amyloglucosidase or fragments thereof. It may be advantageous to add an amyloglucosidase to the production of the hydrolysed whole grain composition, since the sweetness of the preparation increases with the increasing concentration of released glucose. It may also be advantageous if the amyloglucosidase did not influence health properties of the whole grains, directly or indirectly. Thus, in an embodiment the amyloglucosidase shows no hydrolytic activity towards dietary fibers when in the active state. An interest of the invention, and particularly of the process for preparing the frozen confectionary according to the invention, is that it allows reducing the sugar (e.g. sucrose) content of the frozen confectionary product when compared to products described in the prior art. When an amyloglucosidase is used in the enzyme composition, it may become possible to dispense with other external sugar sources e.g. the addition of sucrose.

However, as mentioned above certain alpha-amylases are able to generate glucose units, which may add enough sweetness to the product making the use of amyloglucosidase dispensable. Furthermore, application of amyloglucosidase also increases production costs of the frozen confectionary product and, hence, it may be desirable to limit the use of amyloglucosidases. Thus, In yet an embodiment the frozen confectionary product according to the invention does not comprise an amyloglucosidase such as an exogenic amyloglucosidase.

Glucose isomerase (D-glucose ketoisomerase) causes the isomerization of glucose to fructose. Thus, in an embodiment of the present invention the frozen confectionary product further comprises a glucose isomerase or fragments thereof, which glucose isomerase or fragments thereof show no hydrolytic activity towards dietary fibers when in the active state. Glucose has 70-75% the sweetness of sucrose, whereas fructose is twice as sweet as sucrose. Thus, processes for the manufacture of fructose are of considerable value because the sweetness of the product may be significantly increased without the addition of an external sugar source (such as sucrose or artificial sweetening agents).

A number of specific enzymes or enzyme mixtures may be used for production of the hydrolysed whole grain composition according to the invention. The requirement is that they show substantially no hydrolytic activity in the process conditions used towards dietary fibers. Thus, in an embodiment the alpha-amylase may be selected from Validase HT 425L and Validase RA from Valley Research, Fungamyl from Novozymes and MATS from DSM, the protease may be selected from the group consisting of Alcalase, IZyme B and IZyme G (novozymes).

The concentration of the enzymes according to the invention in the frozen confectionary product may influence the organoleptic parameters of the frozen confectionary product. In addition the concentration of enzymes may also be adjusted by changing parameters such as temperature and incubation time. Thus, in an embodiment the frozen confectionary product comprises 0.0001 to 5% by weight of the total whole grain content in the frozen confectionary of at least one of:

an alpha-amylase or fragment thereof, which alpha-amylase or fragment thereof shows no hydrolytic activity towards dietary fibers when in the active state;

an amyloglucosidase or fragments thereof, which amyloglucosidase shows no hydrolytic activity towards dietary fibers when in the active state; and a glucose isomerase or fragments thereof, which amyloglucosidase shows no hydrolytic activity towards dietary fibers when in the active state.

In yet an embodiment the frozen confectionary product comprises 0.001 to 3% of the alpha-amylase by weight of the total whole grain content in the frozen confectionary product, such as 0.01-3%, such as 0.01-0.1%, such as 0.01-0.5%, such as 0.01-0.1%, such as 0.03-0.1%, such as 0.04-0.1%. In yet an embodiment the frozen confectionary product comprises 0.001 to 3% of the amyloglucosidase by weight of the total whole grain content in the frozen confectionary product, such as 0.001-3%, such as 0.01-1%, such as 0.01-0.5%, such as 0.01-0.5%, such as 0.01-0.1%, such as 0.03-0.1%, such as 0.04-0.1%.

In another further embodiment the frozen confectionary product comprises 0.001 to 3% of the glucose isomerase by weight of the total whole grain content in the frozen confectionary product, such as 0.001-3%, such as 0.01-1%, such as 0.01-0.5%, such as 0.01-0.5%, such as 0.01-0.1%, such as 0.03-0.1%, such as 0.04-0.1%.

Beta-amylases are enzymes which also break down saccharides, however beta-amylases mainly have maltose as the smallest generated carbohydrate entity. Thus, in an embodiment the frozen confectionary product according to the invention does not comprise a beta-amylase, such as an exogenic beta-amylase. By avoiding beta-amylases a larger fraction of the starches will be hydrolysed to glucose units since the alpha amylases do have to compete with the beta-amylases for substrates. Thus, an improved sugar profile may be obtained. This is in contrast to U.S. Pat. No. 5,686,123 which discloses a cereal suspension generated by treatment with both an alpha-amylase and a beta-amylase.

In certain instances the action of the protease is not necessary, to provide a sufficient low viscosity. Thus, in an embodiment according to the invention, the frozen confectionary product does not comprise the protease, such as an exogenic protease. As described earlier the addition of protease may generate a bitter off-taste which in certain instances is desirable to avoid. This is in contrast to U.S. Pat. No. 4,282,319 which discloses a process including enzymatic treatment with a protease and an amylase.

In general the enzymes used according to the present invention for producing the hydrolysed whole grain composition show no hydrolytic activity towards dietary fibers when in the active state. Thus, in a further embodiment the hydrolysed whole grain composition has a substantial intact beta-glucan structure relative to the starting material. In yet a further embodiment the hydrolysed whole composition has a substantial intact arabinoxylan structure relative to the starting material. By using the one or more enzymes according to the invention for the production of the hydrolysed whole grain composition, a substantial intact beta-glucan and arabinoxylan structure may be maintained. The degree of degradation of the beta-glucan and arabinoxylan structures may be determined by Size-exclusion chromatography (SEC). This SEC technique has been described in more detail in "Determination of beta-Glucan Molecular Weight Using SEC with Calcofluor Detection in Cereal Extracts Lena Rimsten, Tove Stenberg, Roger Andersson, Annica Andersson, and Per Åman. Cereal Chem. 80(4):485-490", which is hereby incorporated by reference.

In the present context the phrase "substantial intact structure" is to be understood as for the most part the structure is intact. However, due to natural degradation in any natural product, part of a structure (such as beta-glucan structure or arabinoxylan structure) may be degraded although the degradation may not be due to added enzymes. Thus, "substantial intact structure" is to be understood that the structure is at least 95% intact, such as at least 97%, such as at least 98%, or such as at least 99% intact.

In the present context enzymes such as proteases, amylases, glucose isomerases and amyloglucosidases refer to enzymes which have been previously purified or partly purified. Such proteins/enzymes may be produced in bacteria, fungi or yeast, however they may also have plant origin. In general such produced enzymes will in the present context fall under the category "exogenic enzymes". Such enzymes may be added to a product during production to add a certain enzymatic effect to a substance. Similar, In the present context, when an enzyme is disclaimed from the present invention such disclaimer refers to exogenic enzymes. In the present context such enzymes e.g. provide enzymatic degradation of starch and proteins to decrease viscosity. In relation to the process of the invention it is to be understood that such enzymes may both be in solution or attached to a surface, such as Immobilized enzymes. In the latter method the proteins may not form part of the final product.

As mentioned earlier, the action of the alpha-amylase results in a useful sugar profile which may affect taste and reduce the amount of external sugar or sweetener to be added to the final product.

In an embodiment of the present invention the hydrolysed whole grain composition has a glucose content of at least 0.25% by weight of the hydrolysed whole grain composition, on a dry matter basis, such as at least 0.35%, e.g. at least 0.5%.

Depending on the specific enzymes used the sugar profile of the final product may change. Thus, in an embodiment the frozen confectionary product has a maltose to glucose ratio below 144:1, by weight in the product, such as below 120:1, such as below 100:1 e.g. below 50:1, such as below 30:1, such as below 20:1 or such as below 10:1.

If the only starch processing enzyme used is a glucose generating alpha-amylase, a larger fraction of the end product will be in the form of glucose compared to the use of an alpha-amylase specifically generating maltose units. Since glucose has a higher sweetness than maltose, this may result in that the addition of a further sugar source (e.g. sucrose) can be dispensed. This advantage may be further pronounced if the ratio is lowered by the conversion of the maltose present in the hydrolysed whole grain to glucose (one maltose unit is converted to two glucose units).

The maltose to glucose ratio may be further lowered if an amyloglucosidase is included in the enzyme composition since such enzymes also generates glucose units.

If the enzyme composition comprises an glucose isomerase a fraction of the glucose is changed to fructose which has an even higher sweetness than glucose. Thus, in an embodiment the frozen confectionary product has a maltose to glucose+fructose ratio below 144:1 by weight in the product, such as below 120:1, such as below 100:1 e.g. below 50:1, such as below 30:1, such as below 20:1 or such as below 10:1.

Furthermore, in an embodiment of the present invention the frozen confectionary product may have a maltose to fructose ratio below 230:1 by weight in the product, such as below 144:1, such as below 120:1, such as below 100:1 e.g. below 50:1, such as below 30:1, such as below 20:1 or such as below 10:1.

In the present context the phrasing "total content of the whole grain" is to be understood as the combination of the content of "hydrolysed whole grain composition" and "solid whole grain content". If not indicated otherwise, "total content of the whole grain" is provided as % by weight in the final product. In an embodiment the frozen confectionary product has a total content of the whole grain in the range of 1-35% by weight of the frozen confectionary product, such as 1-20%, such as 1-15%, such as 1-10%, such as 1-7%, preferably 3-30%, more preferably 4-15% (w/w).

In the present context the phrasing "content of the hydrolysed whole grain composition" is to be understood as the % by weight of hydrolysed whole grains in the final product. Hydrolysed whole grain composition content is part of the total content of the whole grain composition. Thus, in an embodiment the frozen confectionary product according to the invention has a content of the hydrolysed whole grain composition in the range 1-30% by weight of the frozen confectionary product, such as 1-20%, such as 1-10% and such as 1-5%. The amount of the hydrolysed whole grain composition in the final product may depend on the type of product. By using the hydrolysed whole grain composition according to the invention in a frozen confectionary, a higher amount of hydrolysed whole grains may be added (compared to a non-hydrolysed whole grain composition) without substantially affecting the organoleptic parameters of the product because of the increased amount of soluble fibers in the hydrolysed whole grain.

It would be advantageous to have a frozen confectionary product comprising a high content of dietary fibers without compromising the organoleptic parameters of the product. Thus, in yet an embodiment the frozen confectionary product has a content of dietary fibers in the range of 0.1-10% by weight of the confectionary, such as 0.1-6% (w/w) by weight of the confectionary product, such as in the range of 0.2-4%, e.g. 0.3-3%, or in the range of 1-2% (w/w). A frozen confectionary product according to the invention may be provided with high amounts of dietary fibers by the addition of the hydrolysed whole grain component provided by the present invention. This may be done due to the unique setup of the process according to the present invention.

Dietary fibers are the edible parts of plants that are not broken down by digestion enzymes. Dietary fibers are fermented in the human large intestine by the microflora. There are two types of fibers: soluble fibers and insoluble fibers. Both soluble and insoluble dietary fibers can promote a number of positive physiological effects, including a good transit through the intestinal tract which helps to prevent constipation, or a feeling of fullness. Health authorities recommend a consumption of between 20 and 35 g per day of fibers, depending on the weight, gender, age and energy intake.

Soluble fibers are dietary fibers that undergo complete or partial fermentation in the large intestine. Examples of soluble fibers from cereals include beta-glucans, arabinoxylans, arabinogalactans and resistant starch type 2 and 3, and oligosaccharides deriving from the latters. Soluble fibers from other sources include pectins, acacia gum, gums, alginate, agar, polydextrose, inulins and galacto-oligosaccharides for instance. Some soluble fibers are called prebiotics, because they are a source of energy for the beneficial bacteria (e.g. Bifidobacteria and Lactobacilli) present in the large intestine. Further benefits of soluble fibers include blood sugar control, which is important in diabetes prevention, control of cholesterol, or risk reduction of cardiovascular disease.

Insoluble fibers are the dietary fibers that are not fermented in the large intestine or only slowly digested by the intestinal microflora. Examples of insoluble fibers include celluloses, hemicelluloses, resistant starch type 1 and lignins. Further benefits of insoluble fibers include promotion of the bowel function through stimulation of the peristalsis, which causes the muscles of the colon to work more, become stronger and function better. There is also evidence that consumption of insoluble fibers may be linked to a reduced risk of gut cancer.

The total solid content of the frozen confectionary according to the invention may vary. Thus, in another embodiment the total solid content is in the range of 15-85% by weight of the confectionary product, preferably in the range of 15-50%, more preferably in the range of 20-35%. Examples of factors influencing the solid content may be the amount of the hydrolysed whole grain composition and the degree of hydrolysis in this composition. In the present context the phrasing "total solid content" equals 100 minus moisture content (%) of the product.

It would be advantageously if a frozen confectionary with good organoleptic parameters, such as sweetness, could be obtained, without addition of large amounts of external sugar sources. Thus, in another embodiment the frozen confectionary product has a content of sucrose of less than 12% by weight of the confectionary, such as less than 10%, less than 7%, less than 5%, less than 3%, less than 1% or such as 0%. Since the hydrolysed whole grain composition supplements the frozen confectionary with a source of carbohydrates, such as glucose and maltose, the frozen confectionary is also sweetened from a natural sugar source different from the external sugar source. Thus, the amount of added external sweetener may be limited.

Sucrose is a widely used sweetener in food products, however others sugars and non-sugar sweeteners may also be used. In a further embodiment the sweetening agent is selected from:

I. a natural sweetening agent such as Momordica Grosvenorii (Mogrosides IV or V), Rooibos extracts, Honeybush extracts, Stevia, Rebaudioside A, thaumatin, Brazzein, Glycyrrhyzic acid and its salts, Curculin, Monellin, phyllodulcin, Rubusosides, Mabinlin, dulcoside A, dulcoside B, siamenoside, monatin and its salts (monatin SS, RR, RS, SR), thaumatin, hernandulcin, phyllodulcin, glycyphyllin, phloridzin, trilobatin, balyunoside, osladin, polypodoside A, pterocaryoside A, pterocaryoside B, mukurozioside, phlomisoside I, periandrin I, abrusoside A, cydocarioside I, erythritol, and/or other natural polyols such as maltitol, mannitol, lactitol, sorbitol, inositol, Isomalt, xylitol, glycerol, propylene glycol, threitol, galactitol, reduced isomaltooligosaccharides, palatinose, reduced xylo-oligosaccharides, reduced gentio-oligosaccharides, reduced maltose syrup, reduced glucose syrup, a monosaccharide, a disaccharide an oligosaccharide, or a mixture thereof;

II. an artificial sweetening agent such as Aspartame, Cyclamate, Sucralose, Acesulfame K, neotame, Saccharin, Neohesperidin dihydrochalcone, or mixtures thereof; or III. a combination of any of the sweeteners listed in I) and II).

In yet an embodiment the frozen confectionary product comprises at least one sugar different from sucrose, wherein said sugar different from sucrose is a monosaccharide and/or a disaccharide and/or an oligosaccharide. In yet an embodiment the monosaccharide is glucose, galactose, dextrose, fructose or any combination thereof. In yet another embodiment the disaccharide is maltose, lactose or any combination thereof.

In an additional embodiment the invention relates to a frozen confectionary product, wherein the content of the sweetening agent is in the range of 10-30% (w/w) by weight of the confectionary product, preferably in the range of 15-20% (w/w) by weight of the confectionary product.

In a further embodiment the frozen confectionary product has a fat content in the range of 1-15% (w/w) of the confectionary product, preferably in the range of 3-10% (w/w) of the confectionary product, more preferably in the range of 5-8% (w/w) of the confectionary product. The amount of fat may vary depending on the type of product. Fat components include milk fat, butter fat, cream and vegetable fats. Preferably, vegetable fats such as cocoa butter, rapeseed oil, sunflower oil or palm oil, preferably not hydrogenated are used.

In another embodiment the frozen confectionary product according to the invention comprises a milk solid non-fat content in the range of 8-25% (w/w), preferably in the range of 10-15% (w/w), more preferably in the range of 5-10% (w/w). again, the amount of milk solid non-fat (MSNF) may vary depending on the type of product.

The overrun of the frozen confectionary product may also vary depending on the type of product. Thus, In an embodiment the confectionary has an overrun of at least 10%, preferably at least 40%, more preferably between 60% and 150%.

In yet an embodiment the frozen confectionary product comprises a stabilizer and/or emulsifier in the range of 0.01-3% (w/w) of the confectionary product. In an additional embodiment the content of the emulsifier component is in the range of 0.1 to 0.5% (w/w) of the confectionary product.

Suitable emulsifiers to be used are monoglycerides, diglycerides, polysorbate or polyol esters of fatty adds such as propylene glycol monoester of fatty acids, as well as natural emulsifiers such as egg yolk, butter milk, raw acacia gum, rice bran extract or mixtures thereof.

Suitable stabilizers which can be used in the present invention include locust bean gum, guar gum, alginates, cellulose, xanthan gum, carboxymethyl cellulose, microcrystalline cellulose, alginates, carrageenans, pectins and mixtures thereof. The stabilizers can be at least partly replaced by the hydrolysed whole grain.

Depending on the specific type of frozen confectionary, different flavor and/or color components may also be added to provide the desired taste and/or color.

The frozen confectionary according to the invention may be different types of frozen product. Thus, In an embodiment the frozen confectionary product is selected from the group consisting of an ice cream, a sorbet, a sherbet, a water ice, a frozen yoghurt, a frozen dairy, a soft ice, a mellorine, a frozen custard, a non-dairy frozen confection, a milk ice, an ice lolly, a gelato, a slush, a frozen dessert or a frozen jelly.

According to a particular embodiment, the frozen confectionary is an ice cream comprising from 0.5 to 20% fat, from 5 to 15% of milk solids non fat, from 5 to 30% of sweetening agent and from 0.1 to 3% of emulsifier and/or stabilizer.

According to another embodiment, the frozen confectionary is a frozen yoghurt comprising 0-12 weight-% fat, 5-15 weight-% non fat milk solids, 5-32 weight-% carbohydrates, 1-5 weight-% proteins and a total solid content of about 30-45 weight-%.

Similarly the frozen confectionary product according to the invention may also form part of a composite food product.

Thus, an aspect of the invention relates to a composite food product comprising a frozen confectionary product according to the invention. In an embodiment the composite frozen confection consists of the confectionary product according to the invention in combination with at least a second component covering partially or totally the frozen confectionery product.

In a further embodiment the second component is chosen from the group consisting of a cereal or granola bar, cereal or granola pieces, entire cereal or granola, a cereal or granola powder, a sponge cake, fruits, a wafer, a biscuit, any coating, a sauce, an inclusion and any combination thereof.

In another embodiment relating to the composite frozen confection the cereal or granola bar, cereal or granola pieces, entire cereal or granola, cereal or granola powder, sponge cake, fruits, the wafer, the biscuit, the coating, the inclusions, and/or the sauce of the frozen composite confectionary product have a content of a hydrolysed whole grain composition of at least 5% (w/w), preferably at least 10% (w/w), more preferably at least 15% (w/w).

In yet an embodiment the composite frozen confection has a dietary fiber content in the range of 0.5 to 8% by wt, preferably 1 to 5% by weight, more preferably 2 to 4% by weight and preferably up to 7% by weight, preferably 2 to 5% by weight.

For the aspect of providing the product of the present invention a process is provided for preparing a frozen confectionary product, said process comprising:

1) preparing a hydrolysed whole grain composition, comprising the steps of:
   a) contacting a whole grain component with an enzyme composition in water, the enzyme composition comprising at least one alpha-amylase, said enzyme composition showing no hydrolytic activity towards dietary fibers,
   b) allowing the enzyme composition to react with the whole grain component, to provide a whole grain hydrolysate,
   c) Providing the hydrolysed whole grain composition by inactivating said enzymes when said hydrolysate has reached a viscosity comprised between 50 and 5000 mPa·s measured at 65° C.,
   d) optionally concentrating and drying the hydrolysed whole grain component,
2) mixing the hydrolysed whole grain composition with an ingredient mix comprising 0 to 20% by weight fat, up to 25% by weight milk solids non fat (MSNF), 5 to 35% sweetening agent and up to 3% of stabilizer and/or emulsifier;
3) Optionally homogenizing and pasteurizing the mix;
4) freezing while optionally aerating the mix;
5) Optionally extruding the frozen mix at temperature lower than −11° C.;
6) Optionally hardening the frozen mix.

Alternatively, the following process is also an object of the present invention:

1) preparing a hydrolysed whole grain composition, comprising the steps of:
   a) contacting a whole grain component with an enzyme composition in water, the enzyme composition comprising at least one alpha-amylase, said enzyme composition showing no hydrolytic activity towards dietary fibers,
   b) allowing the enzyme composition to react with the whole grain component, to provide a whole grain hydrolysate,
   c) providing the hydrolysed whole grain composition by inactivating said enzymes when said hydrolysate has reached a viscosity comprised between 50 and 5000 mPa·s measured at 65° C.,
   d) optionally concentrating and drying the hydrolysed whole grain component,
2) Preparing an ingredient mix comprising 0 to 20% by weight fat, up to 25% by weight milk solids non fat (MSNF), 5 to 35% sweetening agent and up to 3% of stabiliser and/or emulsifier;
3) Optionally homogenizing, then pasteurizing the mix;
4) Adding the hydrolysed whole grain composition to the pasteurized mix to provide a combined mix;
5) freezing while optionally aerating the combined mix;
6) Optionally extruding the aerated frozen combined mix at temperature lower than −11° C.;
7) Optionally hardening the frozen combined mix.

In an embodiment the enzyme composition further comprises a protease or fragment thereof, which protease or fragment thereof shows no hydrolytic activity towards dietary fibers when in the active state. Similar, the enzyme composition may comprise an amyloglucosidase and/or and glucose isomerase according to the present invention.

Several parameters of the process may be controlled to provide the frozen confectionary according to the invention. Thus, in an embodiment step 1b) is performed at 30-100° C., preferably 50 to 85° C. In a further embodiment step 1b) is performed for 1 minute to 24 hours, such as 1 minute to 12 hours, such as 1 minute to 6 hours, such as 5-120 minutes. In yet an embodiment step 1b) is performed at 30-100° C. for 5-120 minutes.

In yet a further embodiment step 1c) is allowed to proceed at 70-150° C. for at least 1 second, such as 1-5 minutes, such as 5-120 minutes, such as 5-60 minutes. In an additional embodiment step 1c) is performed by heating to at least 90° C. for 5-30 minutes.

In yet an embodiment the reaction in step 1c) is stopped when the hydrolysate has reached a viscosity comprised between 50 and 4000 mPa·s, such as between 50 and 3000 mPa·s, such as between 50 and 1000 mPa·s, such as between 50 and 500 mPa·s. Viscosity may be measured using a Rapid Visco Analyser from Newport Scientific. The Rapid Visco Analyser measures the resistance of the product to the stirring action of a paddle. The viscosity is measured after 10 minutes stirring, at 65° C. and 50 rpm.

In another embodiment the hydrolysed whole grain composition in step 1) is provided when said hydrolysate has reached a total solid content of 25-50%. By controlling viscosity and solid content the hydrolysed whole grain may be provided in different forms.

In an additional embodiment the hydrolysed whole grain component in step 1c) is provided in the form of a liquid, a concentrate, a powder, a juice or a pure. An advantage of having hydrolysed whole grain composition in different forms is that when used in a food product dilution may be avoided by using a dry or semi dry form. Similarly, if a more moisten product is desirable, a hydrolysed whole grain composition in a liquid state may be used.

Homogenization and pasteurization are carried out under standard conditions well known to a skilled person in the art.

Following standard freezing (step 5), the mixture can be subjected to low temperature freezing. The mix is cooled by extrusion at a temperature of below −11° C., preferably between −12° C. and −18° C. In a screw extruder. The screw extruder may be such as described in WO 2005/070225. Preferably, the extrusion is performed in a single or twin screw extruder. Further information regarding the process can be found in U.S. Pat. Nos. 7,670,635 and 7,261,913.

The above parameters can be adjusted to regulate the degree of starch degradation, the sugar profile, the total solid content and to regulate the overall organoleptic parameters of the final product.

To Improve the enzymatic processing of the whole grain component it may be advantageous to process the grains before or after the enzymatic treatment. By grounding the grains a larger surface area is made accessible to the enzymes, thereby speeding up the process. In addition the organoleptic parameters may be improved by using a smaller particle size of the grains. In an additional embodiment the whole grains are roasted or toasted before or after enzymatic treatment. Roasting and toasting may improve the taste of the final product.

It should be noted that embodiments and features described in the context of one of the aspects or embodiments of the present invention also apply to the other aspects of the invention.

All patent and non-patent references cited in the present application, are hereby incorporated by reference in their entirety.

The Invention will now be described in further details in the following non-limiting examples.

EXAMPLES

Example 1—Preparation of a Hydrolysed Whole Grain Composition

Enzyme compositions comprising Validase HT 425L (alpha-amylase) optionally in combination with Alcalase 2.4 L (protease) were used for the hydrolysis of wheat, barley and oats.

Mixing may be performed in a double jacket cooker, though other industrial equipment may be used. A scraping mixer works continuously and scraps the inner surface of the mixer. It avoids product burning and helps maintaining a homogeneous temperature. Thus enzyme activity is better controlled. Steam may be injected in the double jacket to increase temperature while cold water is used to decrease it.

In an embodiment, the enzyme composition and water are mixed together at room temperature, between 10 and 25° C. At this low temperature, the enzymes of the enzyme composition have a very weak activity. The whole grain component is then added and the ingredients are mixed for a short period of time, usually less than 20 minutes, until the mixture is homogeneous.

The mixture is heated progressively or by thresholds to activate the enzymes and hydrolyse the whole grain component.

Hydrolysis results in a reduction of the viscosity of the mixture. When the whole grain hydrolysate has reached a viscosity comprised between 50 and 5000 mPa·s measured at 65° C. and e.g. a total solid content of 25 to 60% by weight, the enzymes are inactivated by heating the hydrolysate at a temperature above 100° C., preferably by steam injection at 120° C.

Enzymes are dosed according to the quantity of total whole grain. Quantities of enzymes are different depending on the type of whole grain component, as protein rates are different. The ratio water/whole grain component can be adapted according to required moisture for the final liquid whole grain. Usually, the water/whole grain component ratio is 60/40. Percents are by weight.

| Hydrolysed whole wheat | |
|---|---|
| Whole wheat flour | Substrate |
| Enzyme amylase | 0.10% based on the substrate |
| Enzyme protease | 0.05% based on the substrate |

| Hydrolysed whole barley | |
|---|---|
| Whole barley flour | Substrate |
| Enzyme amylase | 0.10% based on the substrate |
| Enzyme protease | 0.05% based on the substrate |

| Hydrolysed whole oats | |
|---|---|
| Whole oats flour | Substrate |
| Enzyme amylase | 0.10% based on the substrate |
| Enzyme protease | 0.05% based on the substrate |

Example 2—Sugar Profile of the Hydrolysed Whole Grain Composition

Hydrolysed whole grain compositions comprising wheat, barley and oat were prepared according to the method in example 1.

Carbohydrates HPAE: The hydrolysed whole grain compositions were analysed by HPAE for illustrating the sugar profile hydrolysed whole grain composition.

Carbohydrates are extracted with water, and separated by ion chromatography on an anion exchange column. The eluted compounds are detected electrochemically by means of a pulsed amperometric detector and quantified by comparison with the peak areas of external standards.

Total Dietary Fibres:

Duplicate samples (defatted if necessary) are digested for 16 hours in a manner that simulates the human digestive system with 3 enzymes (pancreatic alpha-amylase, protease, and amyloglucosidase) to remove starch and protein. Ethanol is added to precipitate high molecular weight soluble dietary fibre. The resulting mixture is filtered and the residue is dried and weighed. Protein is determined on the residue of one of the duplicates; ash on the other. The filtrate is captured, concentrated, and analyzed via HPLC to determine the value of low molecular weight soluble dietary fibre (LMWSF).

Whole wheat:

| | Wheat Reference | Wheat Hydrolysed Alcalase/Validase |
|---|---|---|
| Total sugars (% w/w)) | 2.03 | 24.36 |
| Glucose | 0.1 | 1.43 |
| Fructose | 0.1 | 0.1 |
| Lactose (monohydrate) | <0.1 | <0.1 |
| Sucrose | 0.91 | 0.69 |
| Maltose (monohydrate) | 0.91 | 22.12 |
| Mannitol | <0.02 | <0.02 |
| Fucose | <0.02 | <0.02 |
| Arabinose | <0.02 | 0.02 |
| Galactose | <0.02 | <0.02 |
| Xylose | <0.02 | <0.02 |
| Mannose | <0.02 | <0.02 |
| Ribose | <0.02 | <0.02 |
| Insoluble and soluble fibers | 12.90 | 12.94 |
| LMW fibers | 2.63 | 2.96 |
| Total fibers | 15.53 | 15.90 |

Whole Oats:

| | Oats Reference | Oats Hydrolysed Alcalase/Validase |
|---|---|---|
| Total sugars (% w/w)) | 1.40 | 5.53 |
| Glucose | 0.1 | 0.58 |
| Fructose | 0.1 | 0.1 |
| Lactose (monohydrate) | <0.1 | <0.1 |
| Sucrose | 1.09 | 1.03 |
| Maltose (monohydrate) | 0.11 | 3.83 |

-continued

|  | Oats Reference | Oats Hydrolysed Alcalase/Validase |
|---|---|---|
| Mannitol | <0.02 | <0.02 |
| Fucose | <0.02 | <0.02 |
| Arabinose | <0.02 | <0.02 |
| Galactose | <0.02 | <0.02 |
| Xylose | <0.02 | <0.02 |
| Mannose | <0.02 | <0.02 |
| Ribose | <0.02 | <0.02 |
| Insoluble and soluble fibers | 9.25 | 11.28 |
| LMW fibers | 0.67 | 1.21 |
| Total fibers | 9.92 | 12.49 |

Whole Barley:

|  | Barley Reference | Barley Hydrolysed Alcalase/Validase |
|---|---|---|
| Total sugars (% w/w)) | 1.21 | 5.24 |
| Glucose | 0.1 | 0.61 |
| Fructose | 0.1 | 0.1 |
| Lactose (monohydrate) | <0.1 | <0.1 |
| Sucrose | 0.90 | 0.88 |
| Maltose (monohydrate) | 0.11 | 3.65 |
| Mannitol | <0.02 | <0.02 |
| Fucose | <0.02 | <0.02 |
| Arabinose | <0.02 | <0.02 |
| Galactose | <0.02 | <0.02 |
| Xylose | <0.02 | <0.02 |
| Mannose | <0.02 | <0.02 |
| Ribose | <0.02 | <0.02 |
| Glucose | 0.1 | 0.61 |
| Fructose | 0.1 | 0.1 |
| Insoluble and soluble fibers | 9.70 | 10.44 |
| LMW fibers | 2.23 | 2.63 |
| Total fibers | 11.93 | 13.07 |

The results clearly demonstrate that a significant increase in the glucose content is provided by the hydrolysis where the glucose content of the hydrolysed barley is 0.61% (w/w) on a dry matter basis; the glucose content of the hydrolysed oat is 0.58% (w/w) on a dry matter basis; and the glucose content of the hydrolysed wheat is 1.43% (w/w) on a dry matter basis.

Furthermore, the results also demonstrates that the maltose:glucose ratio is ranging from about 15:1 to about 6:1.

Thus, based on these results a new sugar profile is provided having a increased sweetness compared to the prior art.

In conclusion, an increased sweetness may be obtained by using the hydrolysed whole grain composition according to the invention and therefore the need for further sweetening sources may be dispensed or limited.

In addition, the results demonstrate that the dietary fiber content is kept intact and the ratio and amount of soluble and insoluble fibers are substantially the same in the non-hydrolysed whole grain and in the hydrolysed whole grain composition.

Example 3—Hydrolytic Activity on Dietary Fibers

The enzymes Validase HT 425L (Valley Research), Alcalase 2.4L (Novozymes) and BAN (Novozymes) were analysed using a thin layer chromatography analysis for activity towards arabinoxylan and beta-glucan fibre extracts both components of dietary fibers of whole grain.

The results from the thin layer chromatography analysis showed that the amylase Validase HT and the protease Alcalase showed no hydrolytic activity on either beta-glucan or arabinoxylan, while the commercial alpha-amylase preparation, BAN, causes hydrolysis of both the beta-glucan and arabinoxylan, see FIG. 1. See also example 4.

Example 4—Oat/3-Glucan and Arabinoxylan Molecular Weight Profile Following Enzymatic Hydrolysis Hydrolysis:

A solution of 0.5% (w/v) of Oat p-Glucan medium viscosity (Megazyme) or Wheat Arabinoxylan medium viscosity (Megazyme) was prepared in water.

The enzyme was added at an enzyme to substrate ratio (E/S) of 0.1% (v/v). The reaction was allowed to proceed at 50° C. for 20 minutes, the sample was then placed at 85° C. during 15 min to enable starch gelatinization and hydrolysis. The enzymes were finally inactivated at 95° C. for 15 minutes. Different batches of the following enzymes have been evaluated.

Alcalase 2.4L (Valley Research): batch BN 00013
batch 62477
batch 75039
Validase HT 425L (Valley Research): batch RA8303A
batch 72044
MATS L (DSM): batch 408280001

Molecular Weight Analysis

Hydrolysed samples were filtered on a syringe filter (0.22 μm) and 25 μL were injected on a High Pressure Uquid Chromatography Agilent 1200 series equipped with 2 TSK-gel columns in serle (G3000PWXL 7.8×300 mm), (GMP-WXL 7.8×30 mm) and with a guard column (PWXL 6×44 mm). (Tosoh Bioscence) Sodium Nitrate 0.1M/at 0.5 ml/min was used as running buffer. Detection was done by reflective index measurement.

Results

Figure 2:
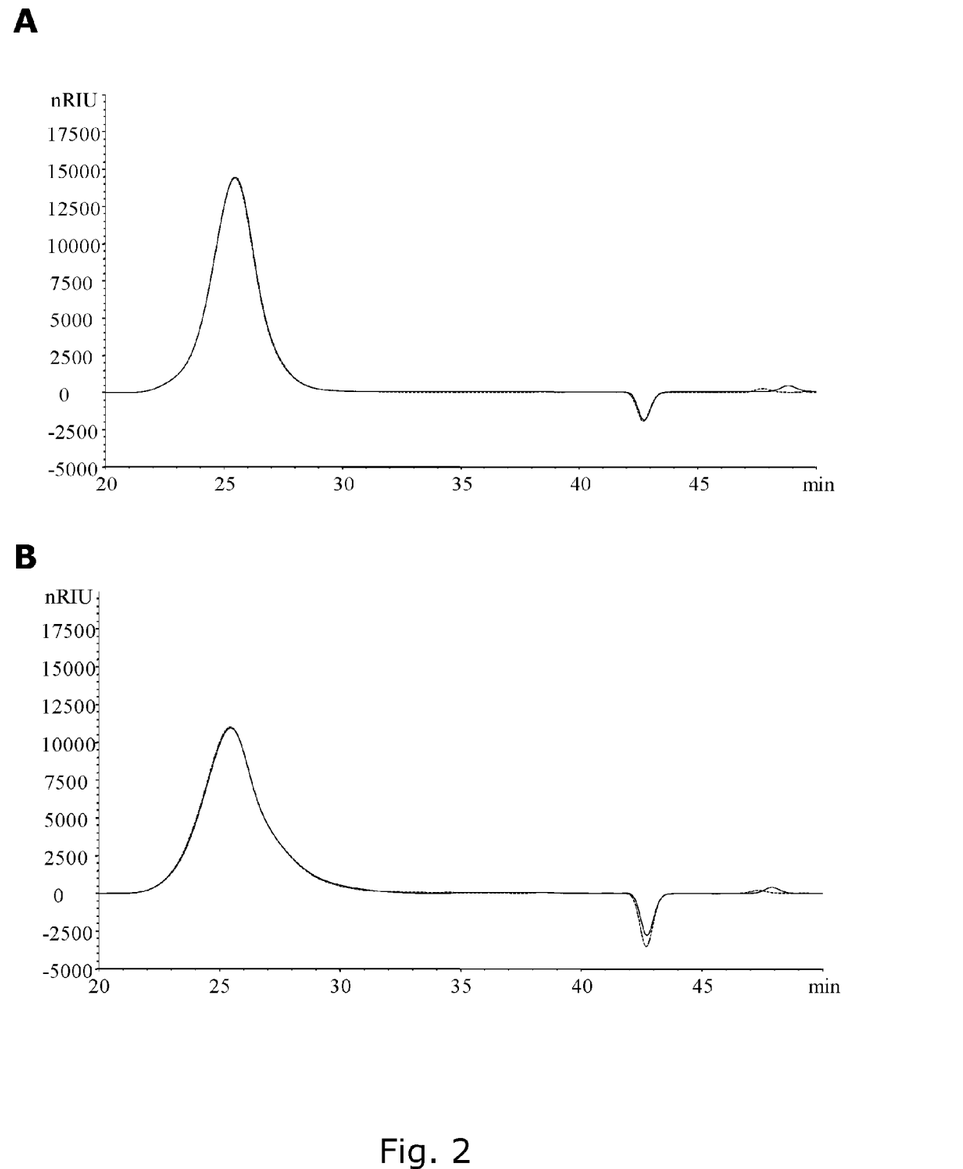
FIG. 2 shows size exclusion chromatography (SEC) of β-Glucan and arabinoxylan molecular weight profile without enzyme addition (plain line) and after incubation with Alcalase 2.4L (dotted line). A) Oat (3-glucan; B) Wheat arabinoxylan.
Figure 3:
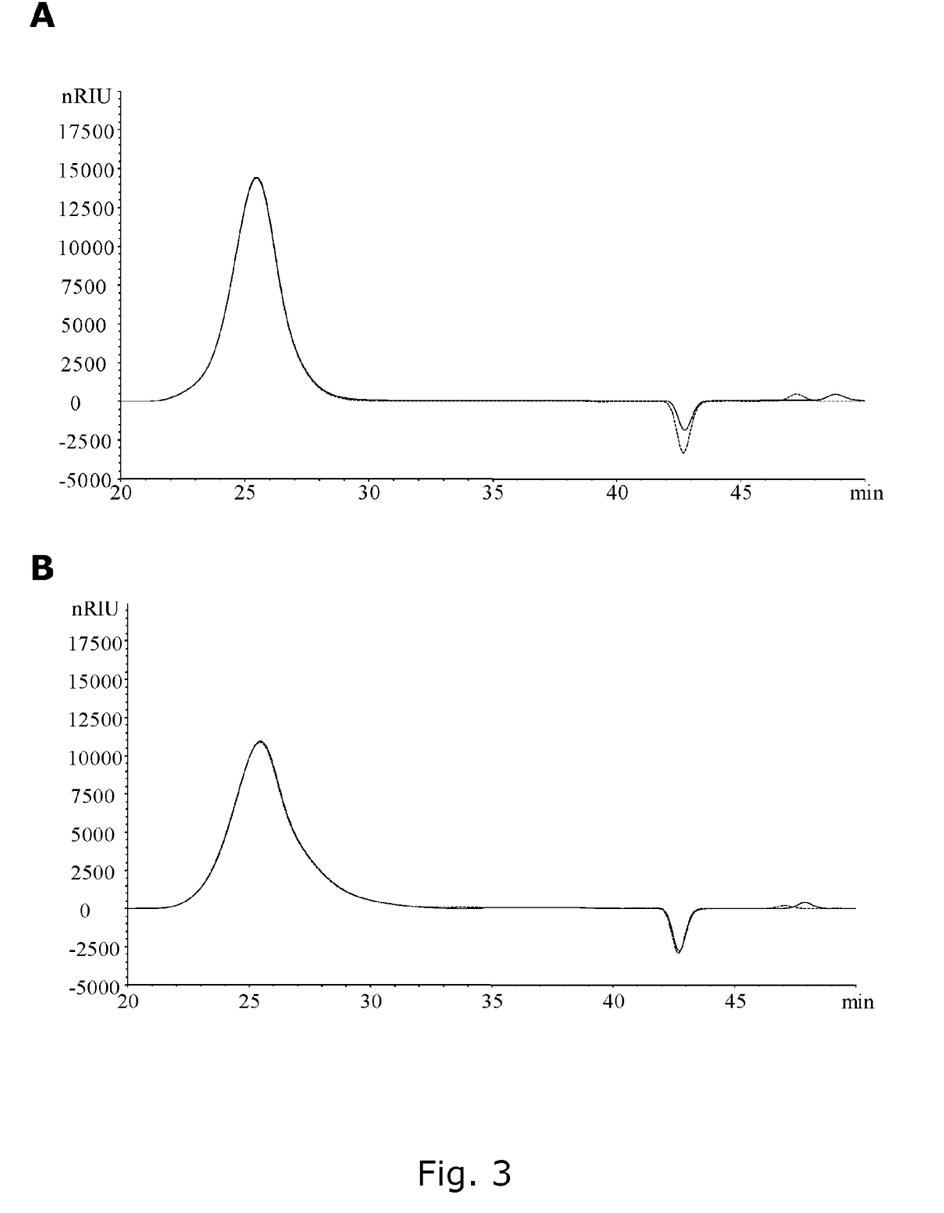
FIG. 3 shows size exclusion chromatography (SEC) of β-Glucan and arabinoxylan molecular weight profile without enzyme addition (plain line) and after incubation with Validase HT 425L (dotted line). A) Oat (3-glucan; B) Wheat arabinoxylan.
Figure 4:
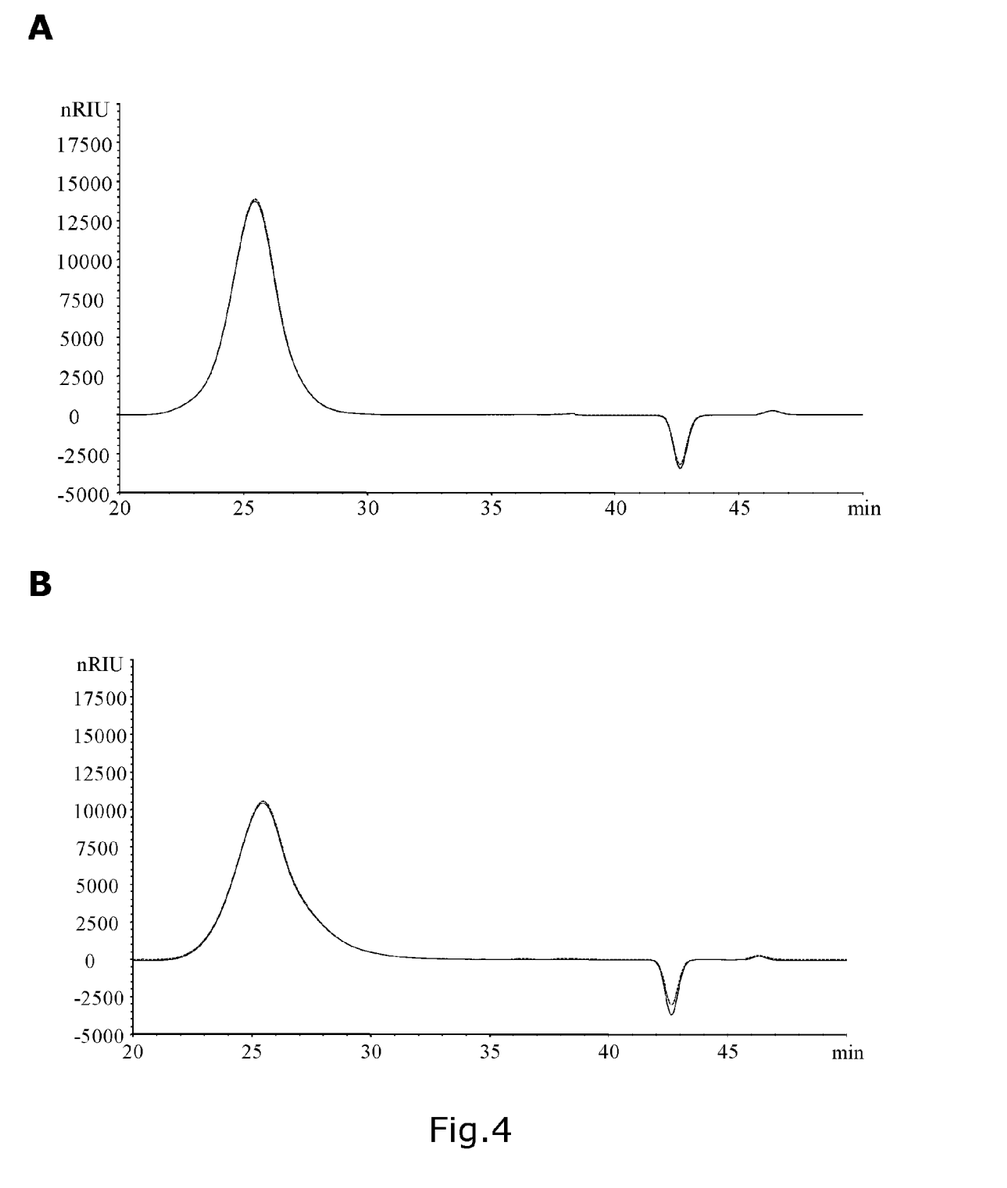
FIG. 4 shows size exclusion chromatography (SEC) of β-Glucan and arabinoxylan molecular weight profiles without enzyme addition (plain line) and after incubation with MATS L (dotted line). A) Oat (3-glucan; B) Wheat arabinoxylan.

On FIGS. 2-4 graphs for both a control (no enzyme) and test with enzymes are plotted. However, since there are substantially no difference between the graphs it may be difficult to differentiate both graphs from each other.

Conclusions

No shift in oat beta glucan and wheat arabinoxylan fibre molecular weight profile was determined following hydrolysis with the Alcalase 2.4 L (FIG. 2), Validase HT 425 L (FIG. 3) or MATS L (FIG. 4).

Example 5—Preparation of an Ice Cream Containing 8 g of Whole Grain/80 g Serving The hydrolysed whole oat from Example 1 was spray dried (alternative: freeze dried/roller Dried).

Ice Cream Containing Whole Grain:

| Ingredient | % by weight |
|---|---|
| Fat | 1-10 |
| MSNF | 2-10 |
| Sweetening agent | 8-16 |
| Emulsifier | 0.01-0.1 |
| Stabiliser | 0.2-0.8 |
| Dried Hydrolysed whole oat TS 97 (moisture content 3%) | 10% |
| Total input ingredients | 100.000 |

The mix of ingredients was homogenised and pasteurized under standard conditions before being stored at a temperature below 4° C. The mix was then cooled and aerated in a freezer with a temperature comprised between −3° C. and −4° C. An overrun of between 20 and 100% was provided. The frozen confection was finally conveyed through a hardening tunnel.

Example 6—Preparation of an Ice Cream Containing 4.5 g of Whole Grain/80 g Serving The hydrolysed whole wheat from Example 1 was spray dried (alternative: freeze dried/roller Dried).

| Ice cream containing whole grain: Ingredient | % by weight |
|---|---|
| Water | 38.7 |
| Cream (30% fat) | 27.8 |
| Skimmed milk powder | 2.4 |
| Sweet whey powder | 6 |
| Sweetening agents | 20.2 |
| Emulsifiers | 0.2 |
| Stabilizers | 0.2 |
| Dried Hydrolysed whole wheat TS 97 (moisture content 3%) | 4.5 |
| Total input ingredients | 100 |

The mix of ingredients was homogenised and pasteurized under standard conditions before being stored at a temperature below 4° C. The mix was then cooled and aerated in a freezer with a temperature comprised between −6° C. and −8° C. An overrun of between 20 and 110% was provided. The frozen confection was finally conveyed through a hardening tunnel.

Example 7—Stabilization of Ice Cream Containing Hydrolysed Whole Grain

Ice creams based on the following recipes of were prepared as described in example 5 and 6. The hydrolysed whole wheat from Example 1 was spray dried (alternative: freeze dried/roller Dried).

| Ingredients | Reference (% by weight) | No stabilizer (% by weight) | No stabilizer with 4.5% Hydrolysed whole grain (wheat) (% by weight) |
|---|---|---|---|
| Water | 38.640 | 38.810 | 38.860 |
| Dried Hydrolysed whole wheat TS 97 (moisture content 3%) | 0.000 | 0.000 | 4.500 |
| Sweetening agents | 24.750 | 24.750 | 20.200 |
| Stabilizers | 0.170 | 0.000 | 0.000 |
| Emulisiers | 0.220 | 0.220 | 0.220 |
| Skimmed milk powder | 2.420 | 2.420 | 2.420 |
| Cream (30% fat) | 27.800 | 27.800 | 27.800 |
| Sweet whey powder | 6.000 | 6.000 | 6.000 |
| Total | 100.000 | 100.000 | 100.000 |

The stability of those products was tested using melting or drip test commonly used in the art. This test was performed after having subjected the 3 products to a heat shock cycle.

Tests:
Melting tests were carried on frozen confectionary products. The percentage of melted ice cream was measured according to the following formula over time (hours):

$$\% \, meltedIceCream = \frac{m_4 - m_3}{m_1 - m_2} * 100$$

In which, m1 is the mass of the frozen confectionary product with its package in grams; m2 is the mass of the package alone in grams, m3 is the mass of the container alone in grams and m4 is the mass of the container with the dripped product at a given time in grams.

Heat Shock Cycle:
Heat shock stresses were applied to samples over 7 days and each heat shock cycle lasted for 24 hours with temperature variations of between −20° C. to −8° C.

Figure 5:
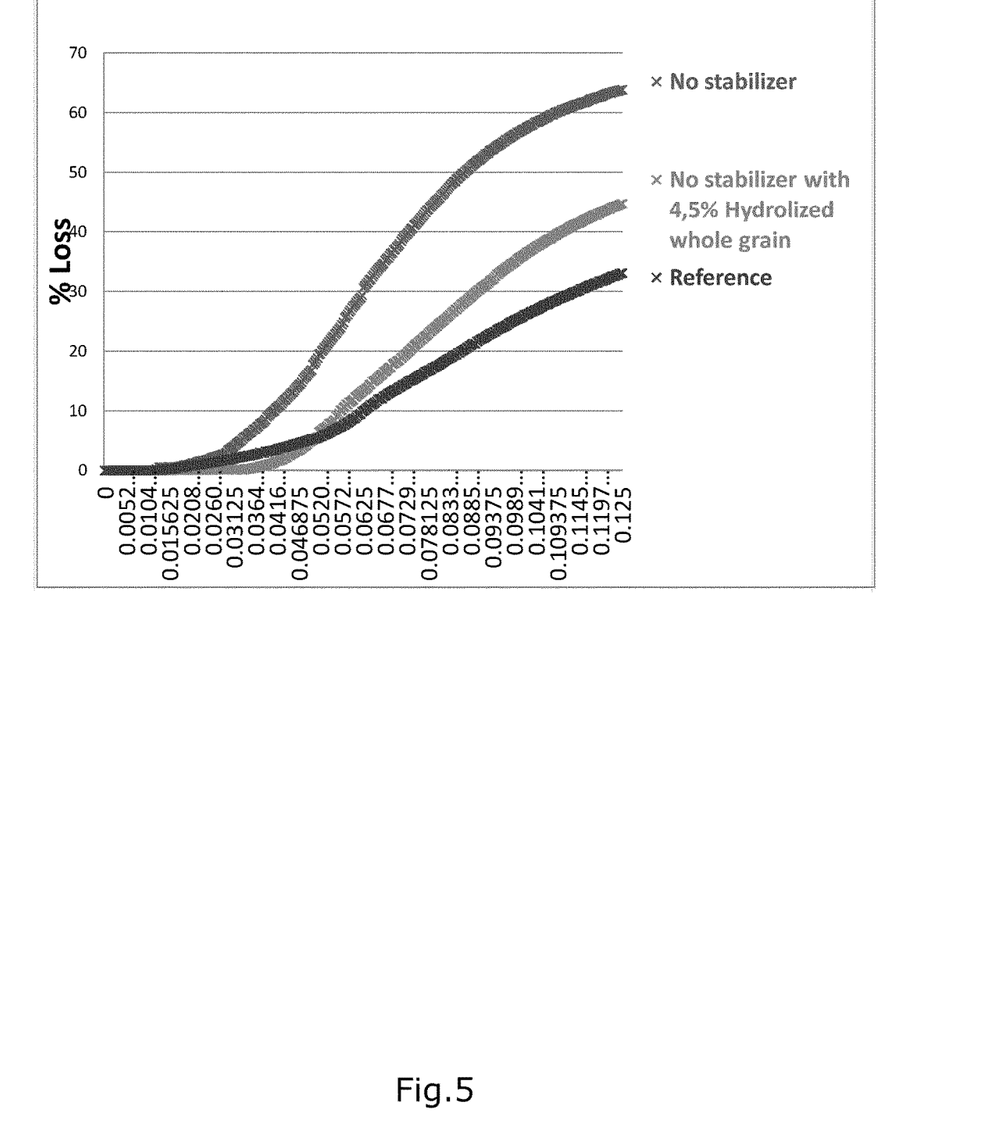
FIG. 5 shows results of a melting test performed on 3 ice cream samples, namely a reference, a product without any stabilizer and a product with no stabilizer but with hydrolysed whole grain.

The results of the drip test are represented on FIG. 5. As shown on that graph, the stability decrease observed with a recipe wherein the stabilizer system has been taken out is partially recovered in the recipe with no stabilizer but containing the hydrolysed whole grain which demonstrates the stabilization effect of the ingredient in ice cream.

The invention claimed is:

1. A frozen confectionary product comprising: 0 to 20% by weight fat, up to 25% by weight milk solids non fat, 5 to 35% sweetening agent, and up to 3% of stabiliser and/or emulsifier, and further comprising:
   a hydrolysed whole grain composition having a substantial intact beta-glucan structure relative to a starting material;
   an alpha-amylase or fragment thereof, which alpha-amylase or fragment thereof shows no hydrolytic activity towards dietary fibers when in the active state; and
   a protease or fragment thereof, which protease or fragment thereof shows no hydrolytic activity towards dietary fibers when in the active state.

2. The frozen confectionary product according to claim 1, wherein the protease or fragment thereof is 0.001-5% by weight of the total whole grain content.

3. The frozen confectionary product according to claim 1, comprising an amyloglucosidase or fragment thereof, which amyloglucosidase or fragment thereof shows no hydrolytic activity towards dietary fibers when in the active state.

4. The frozen confectionary product according to claim 1, comprising a glucose isomerase or fragments thereof, which glucose isomerase or fragment thereof shows no hydrolytic activity towards dietary fibers when in the active state.

5. The frozen confectionary product according to claim 1, wherein the hydrolysed whole grain composition has a substantial intact arabinoxylan structure relative to the starting material.

6. The frozen confectionary product according to claim 1, having a total content of a whole grain of 1-35% by weight of the confectionary product.

7. The frozen confectionary product according to claim 1, wherein the confectionary has an overrun of at least 10%.

8. The frozen confectionary product according to claim 1, wherein the sweetening agent is selected from the group consisting of:
   a natural sweetening agent;
   an artificial sweetening agent; and
   a combination of any of the sweeteners.

9. The frozen confectionary product according to claim 1, wherein the content of the sweetening agent is of 10-30% (w/w) by weight of the confectionary product.

10. The frozen confectionary product according to claim 1, wherein the confectionary product has a maltose to glucose ratio below 144:1 by weight in the confectionary product.

11. The frozen confectionary product according to claim 1, wherein the frozen confectionary product is selected from the group consisting of an ice cream, a sorbet, a sherbet, a water ice, a frozen yoghurt, a frozen dairy, a soft ice, a mellorine, a frozen custard, a non-dairy frozen confection, a milk ice, an ice lolly, a gelato, a slush, a frozen dessert and a frozen jelly.

12. A composite frozen confection comprising 0 to 20% by weight fat, up to 25% by weight milk solids non fat, 5 to 35% sweetening agent, up to 3% of stabiliser and/or emulsifier, a hydrolysed whole grain composition having a substantial intact beta-glucan structure relative to a starting material, an alpha-amylase or fragment thereof, which alpha-amylase or fragment thereof shows no hydrolytic activity towards dietary fibers when in the active state, and a protease or fragment thereof, which protease or fragment thereof shows no hydrolytic activity towards dietary fibers when in the active state, in combination with at least a second component, the second component (i) covering partially or totally the frozen confectionery product or (ii) consisting of an inclusion.

13. A process for preparing a frozen confectionary product comprising:
preparing a hydrolysed whole grain composition, comprising the steps of:
contacting a whole grain component with an enzyme composition in water, the enzyme composition comprising an alpha-amylase and a protease, said enzyme composition showing no hydrolytic activity towards dietary fibers,
allowing the enzyme composition to react with the whole grain component, to provide a whole grain hydrolysate having a substantial intact beta-glucan structure relative to a starting material, and
preparing the hydrolysed whole grain composition by inactivating said enzymes when said hydrolysate has reached a viscosity comprised between 50 and 5000 mPa·s measured at 65° C.;
mixing the hydrolysed whole grain composition with an ingredient mix comprising 0 to 20% by weight fat, up to 25% by weight milk solids non fat (MSNF), 5 to 35% sweetening agent, and up to 3% of stabiliser and/or emulsifier.

14. A method for preparing a confectionary product comprising:
contacting a whole grain component with an enzyme composition in water, the enzyme composition comprising an alpha-amylase and a protease, the enzyme composition showing no hydrolytic activity towards dietary fibers,
allowing the enzyme composition to react with the whole grain component, to provide a whole grain hydrolysate having a substantial intact beta-glucan structure relative to a starting material,
providing the hydrolysed whole grain composition by inactivating said enzymes when said hydrolysate has reached a viscosity comprised between 50 and 5000 mPa·s measured at 65° C.,
concentrating and drying the hydrolysed whole grain component; and
preparing a frozen confectionery product from the hydrolysed whole grain component.

15. The frozen confectionary product according to claim 1, wherein the sweetening agent is selected from the group consisting of Momordica Grosvenorii (Mogrosides IV or V), Rooibos extracts, Honeybush extracts, Stevia, Rebaudioside A, thaumatin, Brazzein, Glycyrrhyzic acid and its salts, Curculin, Monellin, Phylloducin, Rubusosides, Mabinlin, dulcoside A, dulcoside B, siamenoside, monatin and its salts (monatin SS, RR, RS, SR), thaumatin, hernandulcin, phyllodulcin, glycyphyllin, phloridzin, trilobatin, baiyunoside, osladin, polypodoside A, pterocaryoside A, pterocaryoside B, mukurozioside, phlomisoside I, periandrin I, abrusoside A, cyclocarioside I, erythritol, and/or other natural polyols such as maltitol, mannitol, lactitol, sorbitol, inositol, Isomalt, xylitol, glycerol, propylene glycol, threitol, galactitol, reduced isomalto-oligosaccharides, palatinose, reduced xylo-oligosaccharides, reduced gentio-oligosaccharides, reduced maltose syrup, reduced glucose syrup, a monosaccharide, a disaccharide an oligosaccharide, Aspartame, Cyclamate, Sucralose, Acesulfame K, neotame, Saccharin, Neohesperidin dihydrochalcone, and mixtures thereof.

16. A process for preparing a frozen confectionary product comprising:
preparing a hydrolysed whole grain composition, comprising the steps of:
contacting a whole grain component with an enzyme composition in water, the enzyme composition comprising an alpha-amylase and a protease, said enzyme composition showing no hydrolytic activity towards dietary fibers,
allowing the enzyme composition to react with the whole grain component to provide a whole grain hydrolysate having a substantial intact beta-glucan structure relative to a starting material,
providing the hydrolysed whole grain composition by inactivating enzymes in the enzyme composition when the hydrolysate has reached a viscosity between 50 and 5000 mPa·s measured at 65° C.,
concentrating and drying the hydrolysed whole grain component,
mixing the hydrolysed whole grain composition with an ingredient mix comprising 0 to 20% by weight fat, up to 25% by weight milk solids non fat (MSNF), 5 to 35% sweetening agent, and up to 3% of stabiliser and/or emulsifier;
homogenizing and pasteurizing the mix;
freezing while aerating the mix;
extruding the frozen mix at temperature lower than −11° C.; and
hardening the frozen mix.

17. The frozen confectionary product according to claim 1, wherein the fat is 5-8 wt % of the product.

18. The frozen confectionary product according to claim 1, wherein the sweetening agent is 15-20 wt % of the product.

* * * * *